Patented Dec. 4, 1934

1,983,005

UNITED STATES PATENT OFFICE 1,983,005

POSITIVE SENSITIZED PAPER

Sueo Sakurai, Koishikawa-Ku, Tokyo, Japan, assignor to Zaiden Hojin Rikagaku Kenkyujo, Tokyo, Japan No Drawing. Application June 22, 1933, Serial No. 677,172. In Japan May 14, 1927

5 Claims. (Cl. 95—7)

This invention relates to a process of manufacturing positive sensitized paper, consisting in coating paper with an aqueous solution of zinc salt of diazotized p-aminodiphenylamine or manganese salt of diazotized p-aminodiphenylamine mixed with an organic or inorganic acid and also with or without the addition of an azo-color component and in drying the same and the invention also relates to the product thereof.

The object of the invention is to obtain a sensitized paper which will stand long preservation and which, by a simple process, will at once produce a clear positive copy of the original picture. Any suitable paper coated on one side with said solution and dried, if kept in a dark place and protected from moisture and injurious gases, may be preserved for a great length of time. This paper, with a picture placed upon its sensitized side, is then exposed to light, when the diazo compound in that part only which has been acted upon by light is decomposed and loses the property of combining with the azo-color component, so that in the case where an azo-color component is added it only remains either to soak the exposed paper in an alkaline solution or to bring it in contact with an alkaline gas. Azo-color is then developed in that part only which has not been acted upon by light, and a clear positive reprint of the original is at once produced. In case where an azo-color component is not added to the solution, this is added to the developing alkaline solution and the same result is obtained as evidently understood.

The aim of the invention being to obtain a sensitized paper which will stand long preservation and which, by a simple process, will at once produce a clear positive copy of the original picture, this invention enables me to do away with all the defects of the ordinary blue print hitherto in use.

In illustration of the preparation of zinc salt of diazotized p-aminodiphenylamine, the following instance may be cited: 18.4 parts of p-aminodiphenylamine are dissolved in a solution of 20 parts of concentrated hydrochloric acid in 200 parts of water, diazotized, after bringing it down to a low temperature, with a solution of 7 parts of sodium nitrite in 50 parts of water, and 15 parts of zinc sulphate are added, when the zinc sulphate salt of diazotized p-aminodiphenylamine is obtained. The melting point of this salt is 138° C. and it has the following constitution:

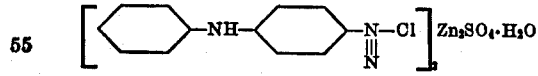

By the analogous process one can easily obtain zinc chloride salt of diazotized p-aminodiphenylamine when using zinc chloride instead of zinc sulphate in the above example. The melting point of this zinc chloride salt of diazotized p-aminodiphenylamine is 147° C. and it has the following constitution:

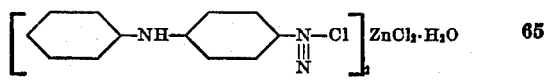

When 20 parts of manganese sulphate is used instead of zinc sulphate in the above example, manganese sulphate salt of diazotized p-aminodiphenylamine is obtained, the melting point of which is 173° C.

Example.—1 part of said zinc salt, either sulphate or chloride, or said manganese salt of diazotized-p-aminodiphenylamine and 1 part of 1-naphthol-3.8-disulfonic acid are dissolved in 200 parts of water, with the addition of 2 parts of tartaric acid. This solution gives the required sensitized paper. The exposed paper is developed with an alkaline solution or gas, and a blue positive print is obtained.

Instead of tartaric acid in the above example, oxalic acid, citric acid, phosphoric acid or chloric acid can be equally used.

Also, the azo-color component, that is, 1-naphthol-3.8-disulfonic acid may be replaced by other kinds of the class, for instance, by 1-amino-8-naphthol-3.6-disulfonic acid or 1-naphthol-4-sulfonic acid etc. Further, the azo-color component may be omitted from the coating solution and added to the developing alkaline solution.

What I claim is:—

1. A positive sensitized paper having a dry coating, composed of zinc salt of p-diazo-diphenylamine in admixture with an acid.

2. A positive sensitized paper having a dry coating, composed of zinc salt of p-diazo-diphenylamine in admixture with an acid and an azo-color component.

3. A positive sensitized paper having a dry coating, composed of manganese salt of p-diazo-diphenylamine in admixture with an acid.

4. A positive sensitized paper having a dry coating, composed of manganese salt of p-diazo-diphenylamine in admixture with an acid and an azo-color component.

5. A positive sensitized paper having a dry coating composed of a metal salt of p-diazo-diphenylamine in admixture with an acid, said metal salt being selected from a group consisting of zinc salt and manganese salt.

SUEO SAKURAI.